United States Patent
Choi et al.

(10) Patent No.: US 7,595,352 B2
(45) Date of Patent: Sep. 29, 2009

(54) PHOTO-CURABLE ADHESIVE COMPOSITION, OPTICAL PICK-UP DEVICE USING THE SAME, AND OPTICAL RECORDING/REPRODUCING DRIVE INCLUDING THE OPTICAL PICK-UP DEVICE

(75) Inventors: Young-se Choi, Suwon (KR); Hyung-tae Kim, Seoul (KR); Do-hoan Nam, Suwon (KR); Soo-han Park, Youngin (KR); Dovid Azrielevich Aronovich, Nizhegorodskaya obl. (RU); Valentin Vasilievich Guzeev, Nizhegorodskaya obl. (RU); Vladimir Borisovich Mozzhukhin, Nizhegorodskaya obl. (RU); Alexandr Petrovich Sineokov, Nizhegorodskaya obl. (RU); Natalya Alexandrovna Ustyuzhantseva, Nizhegorodskaya obl. (RU); Zyakia Saibasakhovna Khamidulova, Nizhegorodskaya obl. (RU)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 184 days.

(21) Appl. No.: 11/439,430

(22) Filed: May 24, 2006

(65) Prior Publication Data
US 2007/0054975 A1    Mar. 8, 2007

Related U.S. Application Data

(63) Continuation of application No. PCT/RU03/00517, filed on Nov. 24, 2003.

(51) Int. Cl.
*C08F 2/46*   (2006.01)
*C08F 2/50*   (2006.01)
*C08J 3/28*   (2006.01)

(52) U.S. Cl. .............. 522/95; 522/90; 522/96; 522/13; 522/24; 522/81; 522/83; 522/173; 523/223; 524/783; 524/786; 524/787; 524/789; 156/275.5; 156/275.7; 156/331.7; 428/355 N; 428/355 AC; 428/355 R; 428/356

(58) Field of Classification Search .............. 522/90, 522/96, 13, 24, 81, 83, 173; 523/223; 524/783, 524/786, 787, 789; 156/275.5, 275.7, 331.7; 428/355 N, 355 AC, 355 R, 356
See application file for complete search history.

(56) References Cited

U.S. PATENT DOCUMENTS 6,479,563 B1 * 11/2002 Liebing et al. ................ 522/13

FOREIGN PATENT DOCUMENTS

| JP | 59-122568 | | 7/1984 |
| JP | 62010179 A | * | 1/1987 |
| JP | 62-143908 | | 6/1987 |
| RU | 2 138 529 | | 9/1997 |
| WO | WO 0077108 A1 | * | 12/2000 |

OTHER PUBLICATIONS

Aerosil R202. Product Information from deguss (Mar. 2004). [online]. [retrieved Feb. 14, 2008], Retrieved from the internet <URL: http://birdchem.com/pdf/aerosil-r202.pdf>.*

* cited by examiner

*Primary Examiner*—Sanza L McClendon
(74) *Attorney, Agent, or Firm*—Lee & Morse, P.C.

(57) ABSTRACT

A photo-curable adhesive composition includes oligourethane acrylate in a range of about 11 to about 23% by weight, reactive monomer-diluent in a range of about 11 to about 24% by weight, silicate filler in a range of about 50 to about 65% by weight, photoinitiator in a range of about 2.5 to about 5.0% by weight, organic peroxide in a range of about 0.1 to about 0.5% by weight, thixotropic agent in a range of about 0.5 to about 3.5% by weight, antioxidant in a range of about 0.005 to about 0.02% by weight, silane finishing agent in a range of about 0.1 to about 2.5% by weight, and oxalic acid in a range of about 0.5 to about 1.5% by weight, based on the total weight of the composition.

16 Claims, 5 Drawing Sheets

FIG. 6

| Components of Compositions | Content (% by weight) | | | | |
|---|---|---|---|---|---|
| | Example 3 | Example 4 | Comparative Example 5 | Comparative Example 6 |
| OUMD-2000T | 5.8 | 5.7 | 5.7 | 5.4 |
| OUMA-3000T | 8.7 | 9.2 | 9.0 | 8.7 |
| Isobornylmethacrylate | 7.1 | 8.0 | 7.5 | 7.5 |
| Dicyclopentenyloxyethylmethacrylate | 7.4 | 8.0 | 7.5 | 7.5 |
| Hydroxypropylmethacrylate | 2.4 | 2.3 | 2.57 | 2.59 |
| Triethyleneglycol dimethacrylate | 1.1 | 0.3 | 1.1 | 1.1 |
| Oxalic acid | 0.7 | 1.2 | - | - |
| Vinyltriethoxy silane | 0.9 | 0.1 | 0.9 | 0.9 |
| Acrylic acid | - | - | - | 0.7 |
| Irgacure-184 | 2.3 | 3.6 | 3.2 | 3.2 |
| Irgacure-651 | 1.2 | 0.5 | - | - |
| t-Butylperbenzoate | 0.2 | 0.2 | 0.2 | 0.2 |
| Boroaluminosilicate glass | 58.69 | - | 60 | 60 |
| Boroaluminosilicate glass, treated by finishing agent A-174 | - | 59.19 | - | - |
| Aerosil-175 | 2.7 | 1.0 | 1.5 | 1.5 |
| Texaphor P-61 | 0.7 | 0.7 | 0.7 | 0.7 |
| BYK-410 | 0.1 | - | 0.12 | - |
| p-Methoxyphenol | 0.01 | 0.01 | 0.01 | 0.01 |

FIG. 7

| Composition | Curing time (s) | Tensile Strength (MPa) | | | Shrinkage (%) | Hardness (Shore D) |
|---|---|---|---|---|---|---|
| | | I | II | III | | |
| Example 3 | 5-10 | 17.0 | 14.0 | 12.0 | 3.6 | 62 |
| Example 4 | 5-10 | 18.0 | 12.0 | 12.0 | 3.7 | 65 |
| Comparative Example 5 | 10-15 | 3.4 | 2.4 | 2.0 | 3.5 | 63 |
| Comparative Example 6 | 10-15 | 10.2 | 7.0 | 6.0 | 3.5 | 62 |
| Prototype | 5-15 | 12.0 | 3.0 | 8.0 | 5.8 | - |

PHOTO-CURABLE ADHESIVE COMPOSITION, OPTICAL PICK-UP DEVICE USING THE SAME, AND OPTICAL RECORDING/REPRODUCING DRIVE INCLUDING THE OPTICAL PICK-UP DEVICE

CROSS-REFERENCE TO RELATED APPLICATION

The present application is a continuation application of International Application No. PCT/RU2003/000517, filed on Nov. 24, 2003, the entire contents of which are incorporated herein by reference for all purposes, and is related to commonly assigned U.S. application Ser. No. 11/439,429, filed on May 24, 2006, entitled "Photo-curable Adhesive Composition, Optical Pick-up Device Using the Same and Optical Recording/Reproducing Drive Including the Optical Pick-up Device," the entire contents of which are incorporated herein by reference for all purposes.

BACKGROUND OF THE INVENTION

1. Field of the Invention

The present invention relates to a photo-curable adhesive composition. More particularly, the present invention relates to a photo-curable adhesive composition suitable for use as an adhesive between metal bases and silicate glass in electronic devices such as, e.g., an optical pick-up device, a thin film transistor—liquid crystal display (TFT-LCD), an organic electroluminescent device, etc.

2. Description of the Related Art

Generally, electronic devices, e.g., optical recording/reproducing drives such as CD drives, DVD drives, blu-ray drives, etc., that include optical elements, may have optical elements adhered to a base. The base may be, e.g., a metal base. A method of securing the optical element to the base may include providing an adhesive between the optical element and the base, and then curing (hardening) the adhesive.

Adhesives that are curable with ultraviolet light (photo-curable or UV-curable adhesives) may be used to secure an optical element to a base. Photo-curable adhesives may exhibit various properties besides adhesion. For example, photo-curable adhesives may be thixotropic, may provide sealing properties, may be photo- and heat-curable, etc. Such properties may be advantageous depending on the nature of the device being manufactured and the particular manufacturing process. Further, the cured photo-curable adhesives may exhibit a variety of material characteristics, e.g., strength, shrinkage, etc., that may be controlled by modifying the composition or the photo-curable adhesive and/or the application thereof.

Moreover, adhesives may be formed from a variety of different materials, e.g., polymers of various types, and may be modified in a number of ways, e.g., through the addition of polymerization initiators and/or regulators, hydrophobic and/or hydrophilic modifiers, fillers such as inorganic fillers, thixotropic agents, etc.

Depending on the nature of the device being manufactured and the particular manufacturing process, the absence of one or more of the above properties or characteristics may lead to a low-quality adhesive joint, distortion of the optical characteristics of the resultant electronic devices, etc.

SUMMARY OF THE INVENTION

The present invention is therefore directed to a photo-curable adhesive composition, an optical pick-up device using the same and an optical recording/reproducing drive including the optical pick-up device, which substantially overcome one or more of the problems due to the limitations and disadvantages of the related art.

It is therefore a feature of an embodiment of the present invention to provide a photo-curable adhesive composition suitable for use as an adhesive between metal bases and silicate glass in electronic devices, optical pick-up devices including the same, and optical recording/reproducing drives having the optical pick-up devices.

It is therefore another feature of an embodiment of the present invention to provide a photo-curable adhesive composition that exhibits thixotropy, rapid curing speed, high adhesion strength even when subjected to moisture and/or heat, low shrinkage and good storage properties.

At least one of the above and other features and advantages of the present invention may be realized by providing a photo-curable adhesive composition including an oligourethane acrylate in a range of about 11 to about 23% by weight, a reactive monomer-diluent in a range of about 11 to about 24% by weight, a silicate filler in a range of about 50 to about 65% by weight, a photoinitiator in a range of about 2.5 to about 5.0% by weight, an organic peroxide in a range of about 0.1 to about 0.5% by weight, a thixotropic agent in a range of about 0.5 to about 3.5% by weight, an antioxidant in a range of about 0.005 to about 0.02% by weight, a silane finishing agent in a range of about 0.1 to about 2.5% by weight, and oxalic acid in a range of about 0.5 to about 1.5% by weight, based on the total weight of the composition.

The antioxidant may be a phenol-type antioxidant. The organic peroxide may be t-butylperbenzoate. The oligourethane acrylate may be a mixture of oligooxyalkyleneurethanemetacrylate and oligobutadieneurethane methacrylate in a mass ratio in a range of about 1:1 to about 4:1.

The monomer-diluent may include about 80 to about 86% by weight of a mixture of isobornylmethacrylate and dicyclopentenyloxyethyl methacrylate, wherein the isobornylmethacrylate and dicyclopentenyloxyethyl methacrylate are in a ratio in a range of about 0.95:1 to about 1:1, about 12.4 to about 13.8% by weight of hydroxypropylmethacrylate, and about 1.6 to about 6.2% by weight of polyfunctional methacrylate monomer, based on the weight of the monomer-diluent.

The silicate filler may include one or more of ground boroaluminosilicate glass and quartz, and a grain size of the filler may be in a range of about 10 to about 40 μm. The silicate filler may include one or more of ground boroaluminosilicate glass and quartz, a grain size of the filler may be in a range of about 1 to about 5 μm, and the filler may be treated with a silane.

At least one of the above and other features and advantages of the present invention may be realized by providing an optical pick-up device including a base and at least one optical element that is adhered to the base using a photo-curable adhesive composition, the photo-curable adhesive composition including an oligourethane acrylate in a range of about 11 to about 23% by weight, a reactive monomer-diluent in a range of about 11 to about 24% by weight, a silicate filler in a range of about 50 to about 65% by weight, a photoinitiator in a range of about 2.5 to about 5.0% by weight, an organic peroxide in a range of about 0.1 to about 0.5% by weight, a thixotropic agent in a range of about 0.5 to about 3.5% by weight, an antioxidant in a range of about 0.005 to about 0.02% by weight, a silane finishing agent in a range of about 0.1 to about 2.5% by weight, and oxalic acid in a range of about 0.5 to about 1.5% by weight, based on the total weight of the composition.

The optical element may be an optical diode, a grating, a collimating lens, a beam splitter, a reflective mirror, a light detector, a front light detector, an objective lens, a concave lens, and a base cover. The optical element may be disposed in a light path of an optical recording/reproducing drive.

At least one of the above and other features and advantages of the present invention may be realized by providing a photo-curable adhesive composition, the photo-curable composition prepared by mixing an oligourethane acrylate, a reactive monomer-diluent, a silicate filler, a photoinitiator, an organic peroxide, a thixotropic agent, an antioxidant, a silane finishing agent, and oxalic acid, wherein the oligourethane acrylate is added in a range of about 11 to about 23% by weight, the reactive monomer-diluent is added in a range of about 11 to about 24% by weight, the silicate filler is added in a range of about 50 to about 65% by weight, the photoinitiator is added in a range of about 2.5 to about 5.0% by weight, the organic peroxide is added in a range of about 0.1 to about 0.5% by weight, the thixotropic agent is added in a range of about 0.5 to about 3.5% by weight, the antioxidant is added in a range of about 0.005 to about 0.02% by weight, the silane finishing agent is added in a range of about 0.1 to about 2.5% by weight, and the oxalic acid is added in a range of about 0.5 to about 1.5% by weight, based on the total weight of the composition.

The oligourethane acrylate may include a first oligourethane acrylate and a second oligourethane acrylate, and the first and second oligourethane acrylates, combined, may be added in a range of about 11 to about 23% by weight, based on the total weight of the composition.

The first oligourethane acrylate may be prepared by adding 2,4-toluylene diisocyanate to hydroxyl-terminated polybutadiene and allowing them to react, adding a solution containing dibutyl tin caprylate dissolved in monomethacrylate propyleneglycol to the reaction product of the 2,4-toluylene diisocyanate and the hydroxyl-terminated polybutadiene; allowing substantially all of any remaining isocyanate groups to react; and adding p-methoxyphenol. The hydroxyl-terminated polybutadiene, the 2,4-toluylene diisocyanate and the monomethacrylate propyleneglycol may be combined in molar ratio of about 1:2:2. The hydroxyl-terminated polybutadiene may be a polymerization product of 1,3-butadiene containing monomer links through 1,4- and 1,2-addition reactions, the oligobutadienediol containing about 30% of 1,4-adducts and about 70% of 1,2-adducts.

The second oligourethane acrylate may be prepared by adding 2,4-toluylene diisocyanate to oxypropylated glycerol having end hydroxyl groups and allowing them to react, adding a solution containing dibutyl tin caprylate dissolved in monomethacrylate propyleneglycol to the reaction product of the 2,4-toluylene diisocyanate and the oxypropylated glycerol having end hydroxyl groups, allowing substantially all of any remaining isocyanate groups to react, and adding p-methoxyphenol. The oxypropylated glycerol having end hydroxyl groups, the 2,4-toluylene diisocyanate and the monomethacrylate propyleneglycol may be combined in molar ratio of about 1:3:3.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 6 tabulates components and component amounts for Examples 3 and 4 of photo-curable adhesive compositions according to embodiments of the present invention, as well as Examples 5 and 6 of comparative photo-curable adhesive compositions; and FIG. 7 tabulates curing rates, physical and mechanical characteristics of cured compositions corresponding to the Examples 3 and 4 and the Comparative Examples 5 and 6 of FIG. 6.

DETAILED DESCRIPTION OF THE INVENTION

Figure 1:
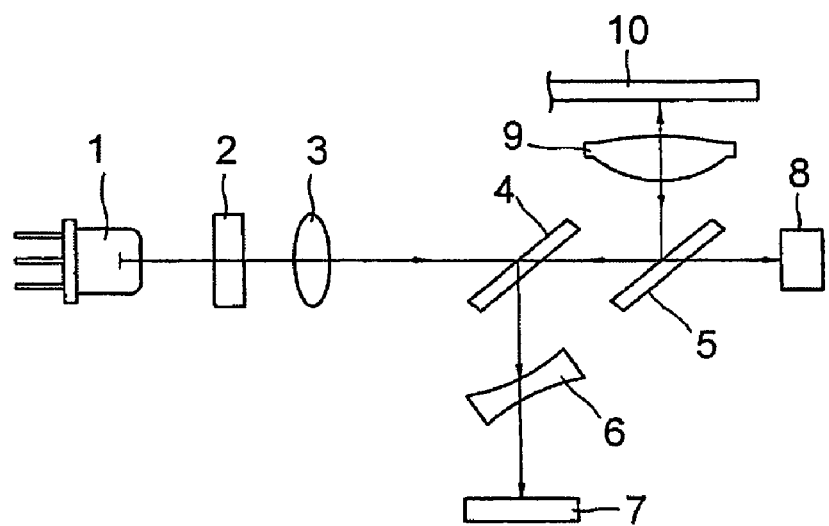
FIG. 1 illustrates an optical system having an optical pick-up device using the photo-curable adhesive composition according to an embodiment of the present invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The photo-curable adhesive composition according to the present invention may be used in electronic devices and may exhibit the following properties: thixotropy, rapid curing speed, high adhesive strength, especially under the influence of moisture and heat, polymerization with low shrinkage, and long-term storage stability without undue loss of service characteristics.

A photo-curable adhesive composition according to an embodiment of the present invention may contain, in % by weight based on the total weight of the composition, an oligourethane acrylate in a range of about 11.0 to about 23.0%, a reactive monomer-diluent in a range of about 11.0 to about 24.0%, a silicate filler in a range of about 50.0 to about 65.0%, photoinitiator in a range of about 2.5 to about 5.0%, an organic peroxide in a range of about 0.1 to about 0.5%, a thixotropic agent in a range of about 0.5 to about 3.5%, an antioxidant in a range of about 0.005 to about 0.02%, a silane finishing agent in a range of about 0.1 to about 2.5%, and oxalic acid in a range of about 0.5 to about 1.5%. The organic peroxide may be, e.g., tert-butylperbenzoate.

The oligourethane acrylate may be mixture of two types. The first type may be prepared by reaction of a polybutadienediol having a molecular mass of about 2000-3000, a diisocyanate of aliphatic or aromatic structure, and an alkyleneglycol monomethacrylate. The second type may be prepared by reaction of a polyoxyalkylenepolyol having a molecular mass of about 1000-5000, a diisocyanate of aliphatic or aromatic structure, and an alkyleneglycol monomethacrylate. The mixture may include the two types in a mass ratio of the first oligourethane acrylate to the second of about 1.0:1 to about 4.0:1. The mass ratio may be about 1.5:1 to about 1.7:1.

In the first type, the polybutadienediol may be a product of polymerization of 1,3-butadiene containing monomer links, through a 1,4 addition reaction and/or a 1,2 addition reaction. The polymerization product may be a copolymer having a content of about 30% of 1,4 addition and about 70% of 1,2 addition.

In the second type, the polyoxyalkylenepolyol may have end hydroxyl groups and may be, e.g., a polyoxyethylenediol, a polyoxypropylenediol, a polyoxypropylenetriol, a polytetramethyleneglycol, etc.

Examples of the diisocyanate may include, e.g., 2,4-toluylene diisocyanate, isophorone diisocyanate, hexamethylene diisocyanate, etc. The alkyleneglycol monomethacrylate may be, e.g., a hydroxyethyl methacrylate, a hydroxypropyl methacrylate, etc.

The monomer-diluent may include a mixture of mono- and poly-functional methacrylates. The mono-functional monomers may have bulky cyclic substituents and may be, e.g., isobornyl methacrylate, dicyclopentenyloxyethyl methacrylate, etc. The mono-functional monomers may be hydroxyl-containing monomers such as, e.g., hydroxyethyl methacrylates, hydroxypropyl methacrylates, etc. The poly-functional methacrylates may be, e.g., triethyleneglycol dimethacrylate (TGM-3), trimethylolpropane trimethacrylate (SR-350), (bis-methacryloyloxyhydroxypropoxyphenyl)propane (Bis-G MA), etc., and mixtures thereof.

In an implementation, the monomer-diluent may include isobornyl methacrylate and dicyclopentenyloxyethyl-methacrylate mixed in a mass ratio of about 0.9:1 to about 1:1, and the amount of the mixture in the monomer-diluent may be about 80 to about 86% by weight of the monomer-diluent. The monomer-diluent may also include about 12.4 to about 13.8% by weight of hydroxypropyl methacrylate, and about 1.6 to about 6.2% by weight of TGM-3 and others.

The silicate filler in the photo-curable adhesive composition may be, e.g., milled boroaluminosilicate glass and/or quartz having a grain size of about 10 to about 40 μm. About 50 to 65% by weight of the silicate filler may be present in the photo-curable adhesive composition, based on the weight of the composition. The composition may also contain about 2.5% by weight of the silane finishing agent. In an implementation, the silicate filler may be preliminarily treated with the finishing agent, and may then be introduced in the same quantity (50-65% by weight). The silane finishing agent may include, e.g., vinyltriethoxy silane, γ-aminopropyltriethoxy silane, methacryloyloxypropyldiethoxymethyl silane, (bis-methacryloyloxyhydroxypropyl) aminopropyltriethoxy silane, 3-methacryloyloxypropyl-trimethoxy silane (A-174), etc.

The thixotropic agent may include, e.g., Aerosil with a specific surface area of about 175 to about 380 m²/g, BYK-410, Texaphor P-61, etc. The antioxidant may be, e.g., p-methoxyphenol, other antioxidants of the phenol type, etc.

The photoinitiator may include, e.g., 1-hydroxycyclohexylphenylketone (Irgacure 184), 2,2-dimethoxyphenylacetophenone (Irgacure 651), bis(2,4,6-trimethylbenzoyl)phenylphosphineoxide (Irgacure 819), 2-methyl-1-(4-methylthiophenyl)2-morpholinpropane-1-on (Irgacure 907), etc., and mixtures thereof.

The composition may further include oxalic acid as an adhesion promoter, which may be used in an amount of about 0.5 to about 1.5% by weight.

The photo-curable adhesive composition according to the present invention may exhibit significantly enhanced adhesion strength. Moreover, the photo-curable adhesive composition may be stable in storage for a year or more, which may be two or more times the stability of other compositions, e.g., those based on acrylic acid.

The photo-curable adhesive composition according to the present invention may be used in an optical pick-up device as part of an optical recording/reproducing drive. The optical pick-up device may include a base and optical elements that are adhered to the base using the photo-curable adhesive composition described above.

FIG. 1 illustrates an optical system having an optical pick-up device using the photo-curable adhesive composition according to an embodiment of the present invention. Referring to FIG. 1, the optical pick-up device may include a light source 1 for emitting light with a predetermined wavelength, a grating 2 for diffracting light emitted from the light source into zero-order and first-order beams, and a collimating lens 3 for providing light waves that are parallel to one another.

The optical pick-up device may also include an objective lens 9 for forming an optical spot on the recording surface of an optical disk 10 and a main light detector 7 for receiving light reflected from the recording surface of the optical disk 10 and detecting signals, e.g., an information signal and an error signal.

The optical pick-up device may further include a beam splitter 4 for guiding light emitted from the light source 1 to the objective lens 9 and for guiding light reflected from the optical disk 10 to the main light detector 7. A concave lens 6 may be placed between the beam splitter 4 and the main light detector 7. The concave lens 6 may be used to correct astigmatism. A second beam splitter 5 may be used to diffract light guided to the objective lens 9 in the direction of the front light detector 8.

The front light detector 8 may be used to detect light power. If the detected light power is less than or exceeds a predetermined level, the power of light emitted from the light source 1 may be adjusted to allow light with power of a predetermined level to reach the optical disk 10.

Figure 2:
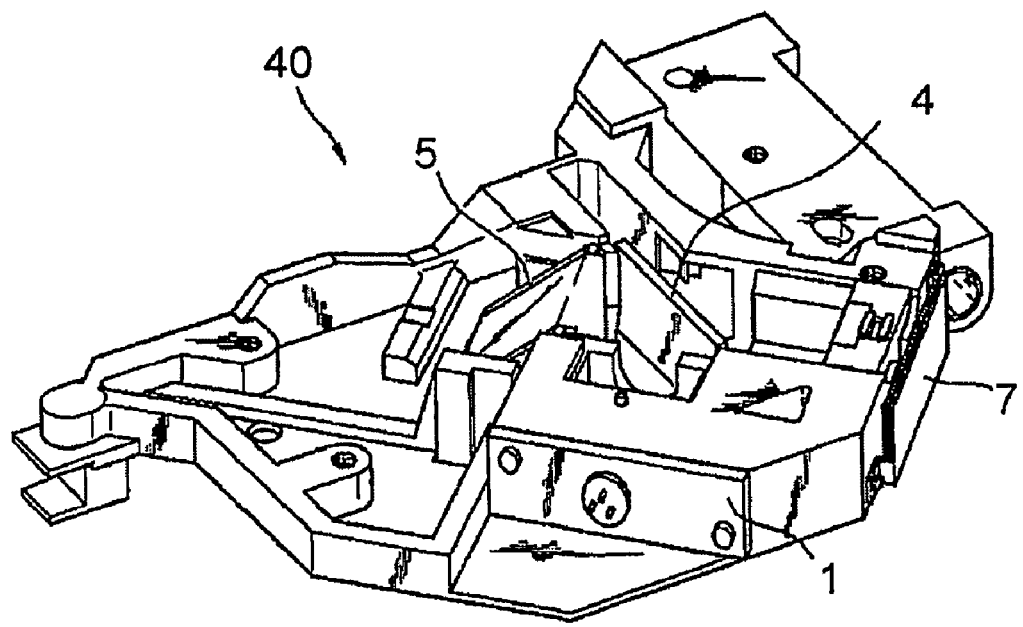
FIG. 2 illustrates an optical pick-up device using the photo-curable adhesive composition according to an embodiment of the present invention.

FIG. 2 illustrates an optical pick-up device using the photo-curable adhesive composition according to an embodiment of the present invention. Referring to FIG. 2, the optical pick-up device 40 may include a metal base, e.g., an aluminium base. The aforementioned optical elements may be placed on predetermined positions of the base and be fixed thereon using the photo-curable resin composition according to the present invention. For example, the grating may be fixed on a grating holder of the base, a laser diode may be fixed on a diode holder of the base, and the beam splitter 5 and collimating lens may be directly fixed on the base. The photo-curable resin composition according to the present invention may be applied to specific sites of the base or the optical elements and exposed to light, e.g., UV light, to be cured.

Figure 3:
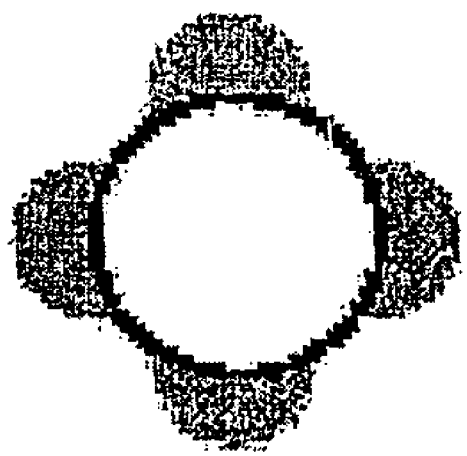
FIG. 3 illustrates a site to which the photo-curable adhesive composition according to an embodiment of the present invention is applied when an objective lens is adhered to a base in an optical pick-up device.

FIG. 3 illustrates a site to which the photo-curable adhesive composition according to an embodiment of the present invention is applied when an objective lens is adhered to a base in an optical pick-up device. Referring to FIG. 3, the objective lens may be adhered to an actuator blade of the base. After the photo-curable resin composition of the present invention is applied to four points of the actuator blade, the objective lens may be placed thereon and exposed to light to cure the composition.

Figure 4:
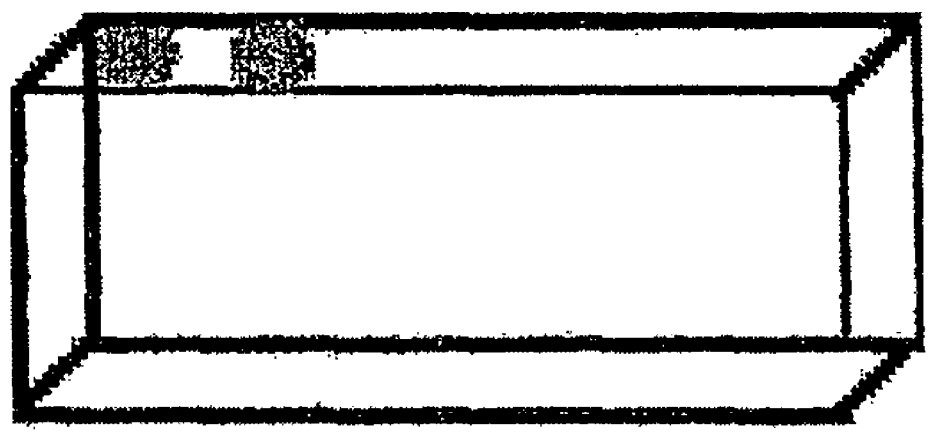
FIG. 4 illustrates a site to which the photo-curable adhesive composition according to an embodiment of the present invention is applied when a beam splitter is adhered to a base in an optical pick-up device.

FIG. 4 illustrates a site to which the photo-curable adhesive composition according to an embodiment of the present invention is applied when a beam splitter is adhered to a base in an optical pick-up device. After the photo-curable resin composition of the present invention is applied to two points of the beam splitter, the beam splitter may be placed on the base and exposed to light to cure the composition.

Figure 5:
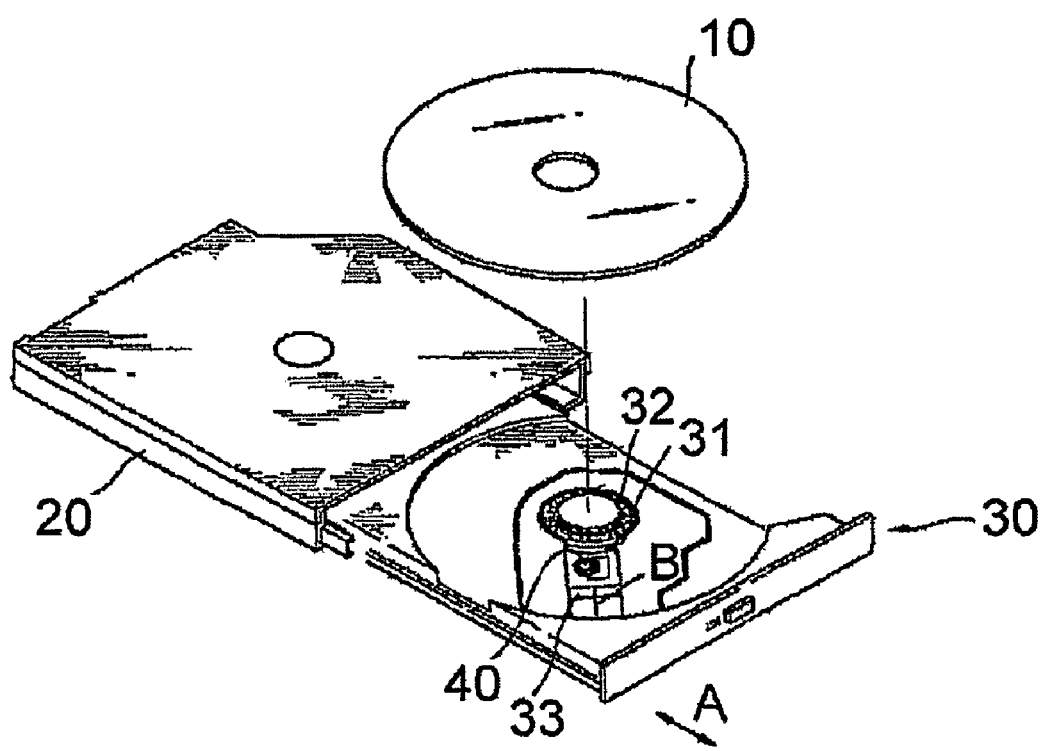
FIG. 5 illustrates an optical recording/reproducing drive with an optical pick-up device using the photo-curable adhesive composition according to an embodiment of the present invention.

FIG. 5 illustrates an optical recording/reproducing drive with an optical pick-up device using the photo-curable adhesive composition according to an embodiment of the present invention. Referring to FIG. 5, a tray 30 may be engaged into the track of a housing 20 in such a manner that it slides in and out of the housing in the direction of arrow "A". The tray 30 may be equipped with a spindle motor 31 and a pick-up base 33. The spindle motor 31 may have a turntable 32 on the rotating shaft thereof. When an optical disk 10 is set on the turntable 32, the spindle motor 31 may start to rotate the optical disk 10. The pick-up base 33 may slide along a radial direction (indicated by arrow "B") of the optical disk 10. An optical pick-up device 40 for accessing the recording surface of the optical disk 10 and recording/reproducing information therefrom may be mounted on the pick-up base 33.

The photo-curable adhesive composition according to the present invention may exhibit desirable properties such as low shrinkage and high adhesion. Therefore, devices using the same may have optical elements well-secured to a base, and thus distortion and/or displacement of the optical elements may be prevented, enabling enhanced precision in the manufacture of the devices. Moreover, lowering of the performance of electronic devices caused by the application of adhesives to undesirable sites may be prevented.

Hereinafter, the present invention will be described with reference to the following Examples. It will be understood that these Examples are provided for descriptive purposes only and not for purposes of limitation.

Methods of preparation of oligourethaneacrylates for photo-curable adhesive compositions according to embodiments of the present invention are presented in Examples 1 and 2, below.

EXAMPLE 1

Preparation of oligobutadieneurethanemethacrylate (OUMD-2000T)

OUMD-2000T is a reaction product of the hydroxyl-terminated polybutadiene (liquid oligomer polybutadiene rubber, copolymer with 1,4- and 1,2-addition products in a ratio of 30:70, molecular mass of 2000) (Krasol LBH-2000, manufactured by Kauchuk Co., Czech Republic), 2,4-toluylene diisocyanate (TDI) and monomethacrylic ester of propylene glycol (MPG), taken in a molar ratio of 1:2:2, in the presence of 0.05% by weight of dibutyl tin dicaprylate (DTD) catalyst and 0.01% by weight of p-methoxyphenol (MH) inhibitor.

150 g of Krasol LBH-2000 was loaded into a reactor and stirred while being heated to 45-50° C. 23.8 g of TDI was added at a rate of 1 g/min, the temperature of the reaction mass not exceeding 55-60° C. When the addition was completed, the reactor contents were kept at 55-60° C. for about 2.5 hours until the content of the isocyanate groups reached 3.3%, at which point the resultant mixture was cooled to 45-50° C.

Then, a solution of 0.096 g of DTD in 19.7 g of MPG was added into the reactor for 20 minutes at temperature 50-55° C. When the addition was completed, the reaction mass was heated to 55-60° C. and stirred for 5-6 hours until residual isocyanate groups were completely consumed, 0.0193 g of p-methoxyphenol inhibitor was added and the resultant mixture was stirred for 30 minutes.

The product was colourless or light yellowish viscous mass. Brookfield dynamic viscosity RVF at 40° C. at 20 rpm (spindle #7) was 134,000 mPa·s.

EXAMPLE 2

Preparation of oligourethanemethacrylate OUME-3000T

OUME-3000T is a reaction product of oxypropylated glycerol having end hydroxyl groups with molecular mass of 3000 (Laprol 3003), 2,4-toluylene diisocyanate (TDI) and monomethacrylic ester of propyleneglycol (MPG). The product OUME-3000T was prepared with a mole ratio of the initial components, Laprol 3003:TDI:MPG, equal to 1:3:3 in the presence of dibutyl tin dicaprylate (DTD) catalyst and p-methoxyphenol (MH) inhibitor. The amount of the catalyst was 0.05% by weight, based on the total load. The amount of the inhibitor was 0.01% by weight.

150 g of Laprol 3003 was loaded into the reactor and 23.9 g of TDI was added at a rate of 1 g/min while mixing, with the temperature of the reaction mass not exceeding 35-55° C. When the addition was completed, the reaction mass was stirred at temperature 35-55° C. for 2.5-3 hours until the content of the isocyanate groups reached 3.7% by weight.

When the content of the isocyanate groups in the reaction mass was less than or equal to 3.7% by weight, 0.097 g of DTD, preliminarily dissolved in 20.7 g of MPG, was added into the reactor for 22 minutes, with the temperature of the reaction mass during the dosage not exceeding 35° C. When the addition was completed, the reaction mass was heated to 50-60° C. and stirred for 4-6 hours until residual isocyanate groups were completely consumed.

When the absence of the residual isocyanate groups was confirmed, the p-methoxyphenol inhibitor was added into the product and the reaction mixture was stirred at temperature 50-60° C. for 30 minutes.

OUME-3000T is a homogeneous, colorless or light yellowish viscous mass. Brookfield dynamic viscosity RVF at 40° C. at 20 rpm (spindle #7) was 18,000 mPa·s.

EXAMPLES 3 AND 4, AND COMPARATIVE EXAMPLES 5 AND 6

Preparation of Photo-Curable Compositions

The components of the compositions prepared in Examples 3 and 4 and Comparative Examples 5 and 6 are tabulated in FIG. 6. The compositions were prepared by thoroughly mixing the respective components in a mixer at 45-20° C. The viscosity of the compositions ranged from 15,000 to 40,000 mPa·s (25° C.), and the thixotropy coefficients were 2-3.

Physical and Mechanical Properties of the Cured Photo-curable Compositions

FIG. 7 tabulates curing rates, physical and mechanical characteristics of cured compositions corresponding to the Examples 3 and 4 and the Comparative Examples 5 and 6 of FIG. 6. The compositions were cured using a UV apparatus (MS SPOT CURE, Model UIS-25102, Japan).

Tensile strength was determined by a standard method using the tearing apparatus Instron, 20 mm/min in 24 hours, after adhering samples of silicate glass (50×50×6 mm) and steel (12×18H10T) (cylindrical samples, d=25 mm), determined at 25° C.

Referring to FIG. 7, the tensile strength measurements in column I reflect initial strength, the tensile strength measurements in column II reflect strength after 72 hours at 60° C. and in an environment with a humidity of 95%, and the tensile strength measurements in column III reflect strength after thermocycling (20 cycles) between +70° C. (1 hour) and −30° C. (1 hour).

Shrinkage was determined based on the density ratio of the liquid and cured adhesive compositions.

Referring to FIGS. 6 and 7, the photo-curable adhesive compositions according to embodiments of the present invention are thixotropic, exhibit a very rapid curing speed and exhibit a high adhesion strength for such applications as silicate glass to metal bonding. Moreover, the adhesion strength is maintained at 65-70% after moist-heat aging and temperature cycling, indicating that the composition maintains its properties for a long time at normal conditions. The photo-curable compositions according to the present invention also exhibit low shrinkage, which may be advantageous. Therefore, these photo-curable adhesive compositions are particularly suitable for use as an adhesive for microelectronic devices and optical elements that require the securing glass and/or quartz to various metals.

In particular, as demonstrated by Examples 3 and 4, photo-curable adhesive compositions according to the present invention may exhibit a thixotropy of K=2-3, a curing speed of 5-10 s when irradiated by UV light with λ=365 nm at 250 mJ/cm$^2$, and a high adhesion strength of ≧15 MPa for silicate glass-steel 12×18H10T. Moreover, the reduction of adhesion strength is no more than 30-35% from the initial strength after application heat, moisture and temperature cycling from +70° C. to −30° C. (20 cycles). Additionally, the photo-curable adhesive compositions according to the present invention may exhibit low shrinkage of 3.5-4% and storage stability of more than one year.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A photo-curable adhesive composition, comprising:
    an oligourethane (meth)acrylate in a range of about 11 to about 23% by weight;
    a reactive monomer-diluent in a range of about 11 to about 24% by weight;
    a silicate filler in a range of about 50 to about 65% by weight;
    a photoinitiator in a range of about 2.5 to about 5.0% by weight;
    an organic peroxide in a range of about 0.1 to about 0.5% by weight;
    a thixotropic agent in a range of about 0.5 to about 3.5% by weight;
    an antioxidant in a range of about 0.005 to about 0.02% by weight;
    a silane finishing agent in a range of about 0.1 to about 2.5% by weight; and
    oxalic acid in a range of about 0.5 to about 1.5% by weight, based on the total weight of the composition, wherein:
    the oligourethane (meth)acrylate is a mixture of oligooxyalkyleneurethane methacrylate and oligobutadieneurethane methacrylate in a mass ratio in a range of about 1:1 to about 4:1.

2. The composition as claimed in claim 1, wherein the antioxidant is a phenol-type antioxidant.

3. The composition as claimed in claim 1, wherein the organic peroxide is t-butylperbenzoate.

4. The composition as claimed in claim 1, wherein the monomer-diluent includes:
    about 80 to about 86% by weight of a mixture of isobornylmethacrylate and dicyclopentenyloxyethyl methacrylate, wherein the isobornylmethacrylate and dicyclopentenyloxyethyl methacrylate are in a ratio in a range of about 0.95:1 to about 1:1;
    about 12.4 to about 13.8% by weight of hydroxypropylmethacrylate; and
    about 1.6 to about 6.2% by weight of polyfunctional methacrylate monomer, based on the weight of the monomer-diluent.

5. The composition as claimed in claim 1, wherein the silicate filler includes one or more of ground boroaluminosilicate glass and quartz, and wherein a grain size of the filler is in a range of about 10 to about 40 μm.

6. The composition as claimed in claim 1, wherein the silicate filler includes one or more of ground boroaluminosilicate glass and quartz,
    a grain size of the filler is in a range of about 1 to about 5 μm, and
    the filler is treated with a silane.

7. An optical pick-up device, comprising:
    a base; and
    at least one optical element that is adhered to the base using a photo-curable adhesive composition, the photo-curable adhesive composition including:
        an oligourethane (meth)acrylate in a range of about 11 to about 23% by weight;
        a reactive monomer-diluent in a range of about 11 to about 24% by weight;
        a silicate filler in a range of about 50 to about 65% by weight;
        a photoinitiator in a range of about 2.5 to about 5.0% by weight;
        an organic peroxide in a range of about 0.1 to about 0.5% by weight;
        a thixotropic agent in a range of about 0.5 to about 3.5% by weight;
        an antioxidant in a range of about 0.005 to about 0.02% by weight;
        a silane finishing agent in a range of about 0.1 to about 2.5% by weight; and
        oxalic acid in a range of about 0.5 to about 1.5% by weight, based on the total weight of the composition.

8. The optical pick-up device as claimed in claim 7 wherein the optical element is at least one of an optical diode, a grating, a collimating lens, a beam splitter, a reflective mirror, a light detector, a front light detector, an objective lens, a concave lens, and a base cover.

9. The optical pick-up device as claimed in claim 8, wherein the optical element is disposed in a light path of an optical recording/reproducing drive.

10. A photo-curable adhesive composition, the photo-curable composition prepared by mixing an oligourethane (meth)acrylate; a reactive monomer-diluent; a silicate filler; a photoinitiator; an organic peroxide; a thixotropic agent; an antioxidant; a silane finishing agent; and oxalic acid, wherein:
- the oligourethane (meth)acrylate is added in a range of about 11 to about 23% by weight,
- the reactive monomer-diluent is added in a range of about 11 to about 24% by weight,
- the silicate filler is added in a range of about 50 to about 65% by weight,
- the photoinitiator is added in a range of about 2.5 to about 5.0% by weight,
- the organic peroxide is added in a range of about 0.1 to about 0.5% by weight,
- the thixotropic agent is added in a range of about 0.5 to about 3.5% by weight,
- the antioxidant is added in a range of about 0.005 to about 0.02% by weight,
- the silane finishing agent is added in a range of about 0.1 to about 2.5% by weight, and
- the oxalic acid is added in a range of about 0.5 to about 1.5% by weight, based on the total weight of the composition wherein:
- the oligourethane (meth)acrylate includes a first oligourethane (meth)acrylate and a second oligourethane (meth)acrylate, and the first and second oligourethane (meth) acrylates, combined, are added in a range of about 11 to about 23% by weight, based on the total weight of the composition.

11. The photo-curable adhesive composition as claimed in claim 10, wherein the first oligourethane (meth)acrylate is prepared by:
- adding 2,4-toluylene diisocyanate to hydroxyl-terminated polybutadiene and allowing them to react;
- adding a solution containing dibutyl tin caprylate dissolved in monomethacrylate propyleneglycol to the reaction product of the 2,4-toluylene diisocyanate and the hydroxyl-terminated polybutadiene;
- allowing substantially all of any remaining isocyanate groups to react; and
- adding p-methoxyphenol.

12. The photo-curable adhesive composition as claimed in claim 11, wherein the hydroxyl-terminated polybutadiene, the 2,4-toluylene diisocyanate and the monomethacrylate propyleneglycol are combined in molar ratio of about 1:2:2.

13. The photo-curable adhesive composition as claimed in claim 11, wherein the hydroxyl-terminated polybutadiene is a polymerization product of 1,3-butadiene containing monomer links through 1,4- and 1,2-addition reactions, the oligobutadienediol containing about 30% of 1,4-adducts and about 70% of 1,2-adducts.

14. The photo-curable adhesive composition as claimed in claim 10, wherein the second oligourethane (meth)acrylate is prepared by:
- adding 2,4-toluylene diisocyanate to oxypropylated glycerol having end hydroxyl groups and allowing them to react;
- adding a solution containing dibutyl tin caprylate dissolved in monomethacrylate propyleneglycol to the reaction product of the 2,4-toluylene diisocyanate and the oxypropylated glycerol having end hydroxyl groups;
- allowing substantially all of any remaining isocyanate groups to react; and
- adding p-methoxyphenol.

15. The photo-curable adhesive composition as claimed in claim 14, wherein the oxypropylated glycerol having end hydroxyl groups, the 2,4-toluylene diisocyanate and the monomethacrylate propyleneglycol are combined in molar ratio of about 1:3:3.

16. The optical pick-up device as claimed in claim 8, wherein the oligourethane (meth)acrylate is a mixture of oligooxyalkyleneurethane methacrylate and oligobutadieneurethane methacrylate in a mass ratio in a range of about 1:1 to about 4:1.

* * * * *